KENNETH V. MATTHEWS
INVENTOR.

BY *Paul R. Harder*

ATTORNEY

United States Patent Office 3,409,373
Patented Nov. 5, 1968

3,409,373
PERIOD CONTROL FOR SPECTROPHOTOMETERS
Kenneth Vincent Matthews, Garden Grove, Calif., assignor to Beckman Instruments, Inc., a corporation of California
Filed Dec. 10, 1965, Ser. No. 512,880
2 Claims. (Cl. 356—96)

This invention relates generally to optical analyzers such as spectrophotometers and more particularly to a new period control circuit which greatly improves the tracking accuracy of such analyzers.

In the double beam optical analyzer, radiation from a source is switched along two paths and re-combined along a common path directed to a radiant energy detector. The sample to be analyzed is placed in one path and the reference material, generally the solvent, in the second. Sample and reference radiation alternately impinge upon the detector which produces an electrical output signal that may be utilized in a number of ways. In the optical null type analyzer the output of the detector is an alternating current error signal having an amplitude proportional to the difference intensities between the reference and sample beams and a phase dependent upon which is larger. This error signal is utilized in a feedback servo loop to control the reference beam attenuator position to balance the beam intensities. The attenuator position is proportional to sample transmittance and the attenuator drive motor may also be coupled to a recording pen to record the spectrum. In the optical analyzer of the double beam ratio recording type the output signal of the detector is sorted into a reference channel and a sample channel and is ratioed to provide an output which is proportional to sample transmittance. This ratio may be recorded to provide a spectrum of the sample as a function of wavelength.

Noise due to various causes is present in optical analyzers and, as is the case in most instruments, it is usually desirable to eliminate or reduce the noise or its effects to some acceptable value. The particular application for which the instrument is being utilized may dictate the degree to which it is desired to eliminate such noise and in many instances various factors must be weighed by the spectroscopist to determine the optimum operation of the instrument. These factors include the noise that can be tolerated, the total period of time necessary to scan the spectrum the desired accuracy of the spectrum, etc. It has been the practice in the past to provide a variable period circuit which limits the response rate of the recording servo loop to control the sensitivity of the instrument to sharp transients, such as noise, in the error signal. The time constant of this period circuit is generally selectable and has commonly caused, when switched from one period to another, a transient in the recorded spectrum. The present invention provides a new and novel period circuit particularly adapted for use in optical analyzers which allows the time constant of the period circuit to be selected while greatly minimizing transient conditions in the recorded spectrum due to such change.

Figure 1:
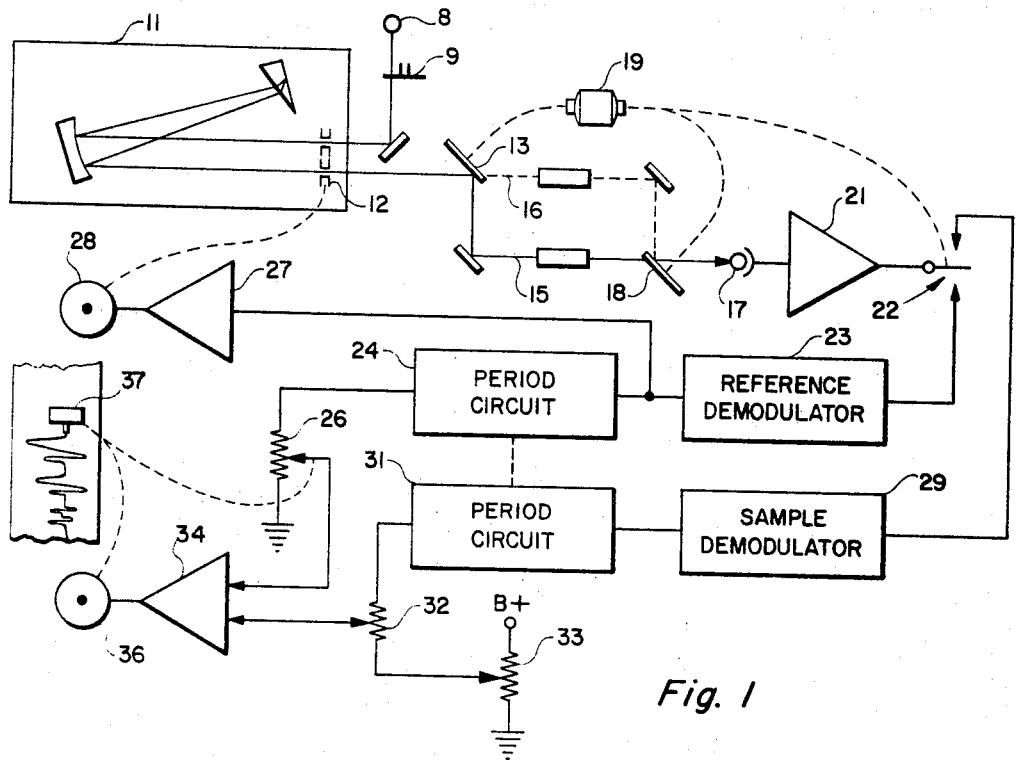
FIG. 1 is a block diagram of an optical analyzer of the double beam ratio recording type.

In the optical analyzer illustrated in FIG. 1 radiation from source 8 after chopping at 9 is dispersed in monochromator 11 and directed through exit slit 12 to a rotating half mirror 13 which switches the radiation alternately along a reference beam path 15 and a sample beam path 16. Radiation passing the reference and sample beam paths is re-combined along a common path to detector 17 by a second rotating half mirror 18 driven in synchronism with beam switching mirror 13 by motor 19. The output of detector 17 is passed by A.C. amplifier 21 to a signal sorter 22 having its armature driven in synchronism with beam switching mirrors 13 and 18 by motor 19. The reference signal passes reference demodulator 23 and period circuit 24 and, in the ratio recording circuit, is applied across slide wire 26 which, in practice, may conveniently be the recorder pen position potentiometer. The output of reference demodulator 23 is also applied to slit servo amplifier 27 which drives slit servo 28 to control the slit size in such a manner as to maintain the reference beam energy substantially constant. As is well known in the art, this slit width control circuit provides constant energy in the excitation beam thereby compensating for variations in instrument efficiency at various wavelengths and further compensates for variations in the output of the source as a function of time or wavelength.

The sample signal is demodulated by sample demodulator 29 and passed by period circuit 31 which has its output connected through potentiometer 32 to the movable contact of potentiometer 33. Potentiometer 33 is connected between a source of potential and circuit ground. The movable contacts of potentiometers 26 and 32 are connected to the inputs of a differential amplifier 34 having its output connected to the recorder pen drive motor 36. The pen drive motor drives the marking pen 37 of any suitable chart recorder and is also connected to the slider of slide wire 26 to provide a position feedback connected to differential amplifier 34. When the instrument is operated as thus far described, i.e., in the double beam mode, the chart recorder provides a record of the ratio of the sample beam intensity to the reference beam intensity as a function of wavelength. Potentiometer 32 provides for setting the 100% point on the ratio recording scale and potentiometer 33 provides a setting for the zero point.

The period circuits 24 and 31 will generally comprise low pass filters which limit the response rate of the servo loops and reduce the sensitivity of the analyzer to sharp transients in the reference and sample signals. These transients are generally the product of noise. The time constant of the period circuit is selected as a compromise between the maximum response rate of the servo loop and the acceptable noise level. This time constant may range from ¼ to 16 seconds and in most commercial analyzers the operator has a choice of several fixed time constants. The simplest form of period circuit utilized in many analyzers is a resistance-capacitance filter section comprising a series resistor and a plurality of selectable shunt capacitors.

If it is desirable to scan the spectrum of a sample in a short period of time the spectroscopist will generally tolerate a reasonably high degree of noise in the spectrum and will utilize a relatively short time constant such that the sensitivity of the servo loops are high for tracking a rapidly changing spectrum. On the other hand, where a high degree of accuracy in the recorded spectrum is required, the spectroscopist will generally scan the spectrum over a long period of time and, correspondingly, the time constant of the period circuit will be long. In many instances the spectroscopist will change time constants during a single scan.

In the system of the prior art where a plurality of capacitors are provided with a selector switch for connecting one or a combination of capacitors in the circuit, transients occur in the recorder when the time constant is changed since the previously unused capacitor generally has zero voltage thereacross at the time it is switched in to the circuit. The transient occurs in the recorder until the new capacitor reaches the charge level of the others in the circuit.

Figure 2:
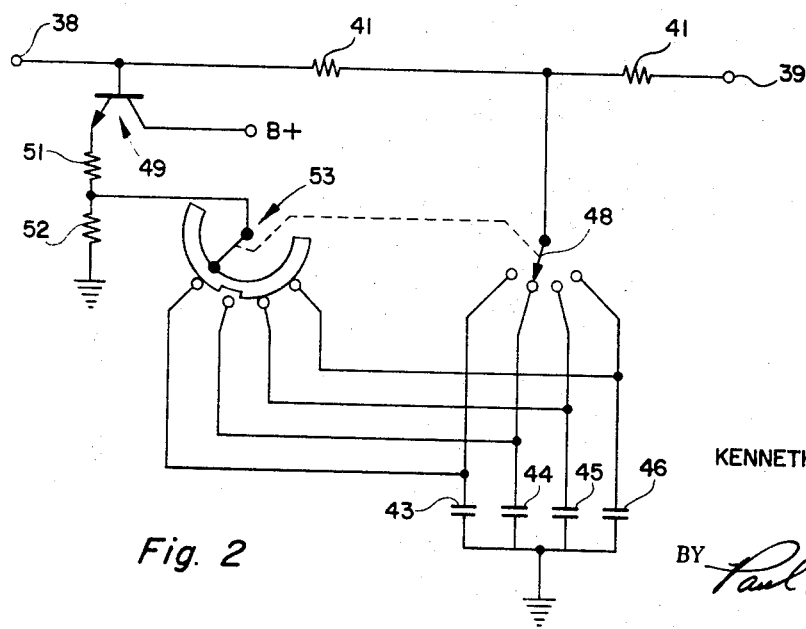
FIG. 2 is a schematic diagram of a preferred period circuit for optical analyzers.

Referring now to FIG. 2 there is illustrated a new and improved period circuit which avoids the aforementioned transients by maintaining all capacitors in the circuit charged to approximately the same voltage level. Between the input and output terminals 38 and 39 of the period circuit are a pair of series resistors 41 and a plurality of capacitors 43–46 which may be selectably connected between the junction of resistors 41 and circuit ground by selector switch 48. It is apparent that without more, as each new capacitor is switched into the circuit a transient is incurred at the output terminal 39 until the capacitor reaches the signal level of the input signal.

To avoid this problem there is provided transistor amplifier 49 connected in emitter-follower arrangement and having the input signal applied to input terminal 38 as its input. A portion of its output applied across a potential divider comprising resistors 51 and 52 is applied across all of capacitors 43–46 which are not, at the time, being utilized in the period filter. This may be accomplished by any suitable switching means 53 mechanically coupled to selector 48. In the particular embodiment capacitor 44 is the active capacitor in the filter circuit and switch 53 connects capacitors 43, 45 and 46 to the output of transistor 49. The gain of transistor 49 and the resistance of potential dividers 51 and 52 may be selected such that the voltage applied to capacitors 43, 45 and 46 is at all times substantially equal to the voltage applied to the active period capacitor which is in use, capacitor 44 in FIG. 2. Transistor 49, in emitter-follower configuration, provides an extremely high input impedance and thus little or no loading to the D.C. input signal at terminal 38. This effectively isolates the unused capacitors from the remaining portion of the circuit while maintaining the voltage across them at approximately the operating voltage of the system without affecting the response period of the instrument.

It should be understood that other switching mechanisms may be utilized and that various combinations of the capacitors may be utilized to provide the various time periods. In such instance it is only necessary to provide a switch which, for any particular combination, will connect the unused capacitors to the output of amplifier 49. Other arrangements may be provided for supplying the input to the unused capacitors, the emitter-follower amplifier being one of the simplest arrangements.

By maintaining all of the capacitors in the period filter at the approximate level of the D.C. signal, switching from one capacitor to another to effect a change in period time response does not result, or at least it greatly minimizes, any transient in the recorded spectrum caused by the new capacitor.

While the period circuit has been described in connection with a double beam ratio recording optical analyzer it may be equally utilized with other spectrophotometers while maintaining the same advantages. Obviously many modifications and variations of the present invention are possible in light of the foregoing teachings and the foregoing disclosure relates only to a preferred embodiment of the invention. It is to be understood, therefore, that the invention may be practiced otherwise than as specifically described without departing from the spirit and scope of this invention as defined by the appended claims.

What is claimed is:

1. An optical analyzer comprising, in combination:
   a radiation source;
   a radiation detector providing an output;
   means providing a beam path from said source to said detector and including monochromator means for dispersing radiant energy in said beam path;
   means connected to the output of said detector for providing a signal that is a function of the intensity of radiation impinging upon said detector;
   period circuit means having an input and an output terminal and including a plurality of capacitors one of which may be selectably connected as an active element in said period circuit;
   means connecting the input terminal of the period circuit means to the means connected to the output of said detector;
   means having its input connected to the input terminal of said period circuit and providing an output as a function thereof;
   means coupling at least one of said plurality of capacitors different from that connected in said period circuit for maintaining the operating voltage of said coupled capacitor at approximately the voltage across said selectably connected capacitor in said period circuit; and
   means connected to the output terminal of said period circuit for measuring the intensity of radiant energy impinging upon said detector.

2. An optical analyzer comprising, in combination:
   a radiation source;
   a radiation detector providing an output;
   means providing a beam path from said source to said detector and including monochromator means for dispersing radiant energy in said beam path;
   means connected to the output of said detector for providing a D.C. signal that is a function of the intensity of radiation impinging upon said detector;
   period circuit means having an input and an output terminal and including a plurality of capacitors one of which may be selectably connected as an active element in said period circuit;
   means connecting the input terminal of the period circuit means to the means connected to the output of said detector;
   high impedance amplifier means having its input connected to the input terminal of said period circuit and providing an output that is a function of the D.C. signal level at said period circuit input;
   means for coupling at least one of said plurality of capacitors to said amplifier means for maintaining the operating voltage level of said coupled capacitor at approximately the voltage across said active element; and
   means connected to the output terminal of said period circuit for measuring the intensity of radiant energy impinging upon said detector.

References Cited

UNITED STATES PATENTS 3,176,576   4/1965   Sundstrom et al. _____ 88—14

JEWELL H. PEDERSEN, *Primary Examiner.*

F. L. EVANS, *Assistant Examiner.*